(12) United States Patent
Miyaji

(10) Patent No.: US 9,993,904 B2
(45) Date of Patent: Jun. 12, 2018

(54) MACHINE TOOL FEED AXIS POSITION CONTROLLER WITH RUNOUT CORRECTION OF TOOL CUTTING EDGES

(71) Applicant: Okuma Corporation, Niwa-Gun (JP)

(72) Inventor: Masashi Miyaji, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 354 days.

(21) Appl. No.: 14/959,214

(22) Filed: Dec. 4, 2015

(65) Prior Publication Data

US 2016/0176004 A1 Jun. 23, 2016

(30) Foreign Application Priority Data

Dec. 19, 2014 (JP) ................................. 2014-257722
Jul. 9, 2015 (JP) ................................. 2015-137975

(51) Int. Cl.
*B23Q 15/013* (2006.01)
*B23Q 15/12* (2006.01)
*G05B 19/404* (2006.01)

(52) U.S. Cl.
CPC ........... *B23Q 15/013* (2013.01); *B23Q 15/12* (2013.01); *G05B 19/404* (2013.01); *G05B 2219/37506* (2013.01); *G05B 2219/49168* (2013.01); *Y02P 90/265* (2015.11)

(58) Field of Classification Search
None
See application file for complete search history.

(56) References Cited

U.S. PATENT DOCUMENTS

| 5,598,077 A * | 1/1997 | Matsubara | G05B 19/404 318/568.22 |
| 5,920,169 A * | 7/1999 | Hamamura | G05B 19/404 318/561 |
| 2004/0183495 A1* | 9/2004 | Iwashita | G05B 19/404 318/638 |
| 2005/0137739 A1* | 6/2005 | Yoshida | G05B 19/404 700/170 |
| 2013/0309034 A1* | 11/2013 | Inagaki | B23Q 17/0976 409/132 |

FOREIGN PATENT DOCUMENTS

JP 2013-240837 A1 12/2013

* cited by examiner

*Primary Examiner* — Mohammad Ali
*Assistant Examiner* — Bernard G Lindsay
(74) *Attorney, Agent, or Firm* — Burr & Brown, PLLC

(57) ABSTRACT

A position controller includes a position detector, a speed command operator, a first adder, a torque command operator, a second adder, a drive unit, a runout amount correcting device, and a third adder. The runout amount correcting device is configured to employ a value related to deviation between a command value and a detection value in physical quantity of a movable part as a reference signal. The runout amount correcting device is configured to calculate a position correction amount from rotation angle information of the main spindle and the reference signal. The runout amount correcting device is configured to estimate a runout amount of a cutting edge of the tool from the reference signal. The runout amount correcting device is configured to calculate the position correction amount such that influences of the respective cutting edges appearing in the reference signal are leveled.

12 Claims, 15 Drawing Sheets

MACHINE TOOL FEED AXIS POSITION CONTROLLER WITH RUNOUT CORRECTION OF TOOL CUTTING EDGES

BACKGROUND

This application claims the benefit of Japanese Patent Application Number 2014-257722 filed on Dec. 19, 2014 and Japanese Patent Application Number 2015-137975 filed on Jul. 9, 2015, the entirety of which is incorporated by reference.

TECHNICAL FIELD

The present invention relates to a position controller of a feed axis. The position controller controls the position of the feed axis considering runout amounts of cutting edges of a tool during machining of a machine tool, especially during heavy cutting of a hard-to-cut material, such as a titanium alloy. This restrains a chatter vibration and a chipping of tool.

RELATED ART

When a hard-to-cut material is machined by milling, a tool, to which detachable cutting edges called "Throwaway" or "Insert" are attached, is used for reducing machining costs. The heights of the attached cutting edges are not uniform in this tool since a surface to which the cutting edge of the tool is attached varies and machining accuracy is different depending on the cutting edge itself. Therefore, runout amounts (relative installation errors between respective cutting edges) are generated. In the case of the cutting edge with a large runout amount, chipping of the tool occurs and a tool lifetime is reduced. Accordingly, the present inventors have provided the invention in Japanese Patent Application Publication No. 2013-240837 (JP-A-2013-240837). In JP-A-2013-240837, an amplitude and a phase are set based on respective positions of cutting edges and previously measured runout amounts, and feed axes are slightly displaced in an opposite direction of a machining advancing direction in synchronization with a main spindle so as to cancel the runout amounts, so that one-cutting edge feed amount of each cutting edge is made close to an originally designated value to reduce chipping of a tool.

The following describes the present invention with an example of a number of cutting edges Z of the tool being 3 [cutting edges]. For convenience of explanation, the respective cutting edges are numbered as #1, #2, and #3.

Assume that preliminary measured runout amounts $C_i$ (i=1 to Z) of the respective cutting edges are: $C_1=0$ [μm], $C_2=20$ [μm], and $C_3=25$ [μm]. When a workpiece is machined with the respective cutting edges in the order of #1, #2, #3, #1, #2, #3, and so on, an increment/decrement $D_i$ (i=1 to Z) of actual machining allowance becomes $D_1=C_1-C_3=-25$ [μm], $D_2=C_2-C_1=20$ [μm], and $D_3=C_3-C_2=5$ [μm]. Assume that the instructed machining allowance (a feed amount of one cutting edge) fz is 80 [μm]. Actual machining allowances $fz_i$ (i=1 to Z) of the respective cutting edges become $fz_1=fz+D_1=55$ [μm], $fz_2=fz+D_2=100$ [μm], and $fz_3=fz+D_3=85$ [μm]. Accordingly, a chipping is likely to occur in the cutting edge #2 whose value is outstandingly large.

Meanwhile, from the rotation angle of the main spindle, a cutting edge that cuts the workpiece is identified. When the cutting edge #1 whose runout amount is small cuts the workpiece, the machining allowance is increased. When the cutting edges #2 and #3 whose runout amounts are large cut the workpiece, the machining allowance is decreased. Thus, superimposing the correction amount to the position command value of the feed axes is considered. That is, assume that a correction amount $R_i$ (i=1 to Z) to the respective cutting edges as: $R_1=15$ [μm], $R_2=-5$ [μm], and $R_3=-10$ [μm]. Apparent runout amounts $C_i+R_i$ become uniform among the respective cutting edges and the actual machining allowances are also uniform. This results in achieving the reduction in chipping of tool.

The machining method in JP-A-2013-240837 needs to preliminary measure the runout amounts of the respective cutting edges with an external device or a similar device. This causes problems that a labor is taken for the work and an external device is required separately from the controller in the machine tool.

Therefore, an object of the present invention is to provide a position controller of a feed axis for a machine tool that does not require an external device and prior measurement in a process of identifying runout amounts of respective cutting edges while ensuring restraining a chipping of tool similar to the conventional position controllers.

SUMMARY

One aspect of the invention provides a position controller of a feed axis for a machine tool. The machine tool rotates a tool attached to a main spindle to machine a workpiece. The machine tool includes a feed axis mechanism with a servo motor to drive a load in a predetermined linear axis direction. The position controller includes a position detector, a speed command operator, a first adder, a torque command operator, a second adder, a drive unit, a runout amount correcting device, and a third adder. The position detector is configured to detect a position of a movable part of the feed axis mechanism so as to control the position of the movable part in accordance with a position command value of the feed axis from a higher-level device. The speed command operator is configured to amplify a deviation between the position command value and a position detection value from the position detector. The first adder is configured to add a speed feed forward and an output from the speed command operator to output a speed command value. The speed feed forward is obtained by differentiation of the position command value. The torque command operator is configured to amplify a deviation between the speed command value and a speed detection value to output a feedback torque. The speed detection value is obtained by detection of the speed of the movable part by a speed detector or by differentiation of the position detection value. The second adder is configured to add a torque feed forward and the feedback torque to output a torque command value. The torque feed forward is obtained by differentiating the speed feed forward and multiplying the differentiated value by a motor shaft conversion inertia of the movable part. The drive unit is configured to drive the servo motor upon the torque command value. The runout amount correcting device is configured to employ a value related to deviation between a command value and a detection value in physical quantity of the movable part as a reference signal, and is configured to calculate a position correction amount from rotation angle information of the main spindle and the reference signal. The rotation angle information is obtained from the higher-level device. The third adder is configured to superimpose the position correction amount to the position command value to correct the position command value. The runout amount correcting device is configured to estimate a runout amount of a cutting edge of the tool from the reference signal, and is configured to calculate the position correction amount such that influences of the respective cutting edges appearing in the reference signal are leveled.

DETAILED DESCRIPTION

The following describes embodiments of the present invention with reference to the drawings.

Figure 1:
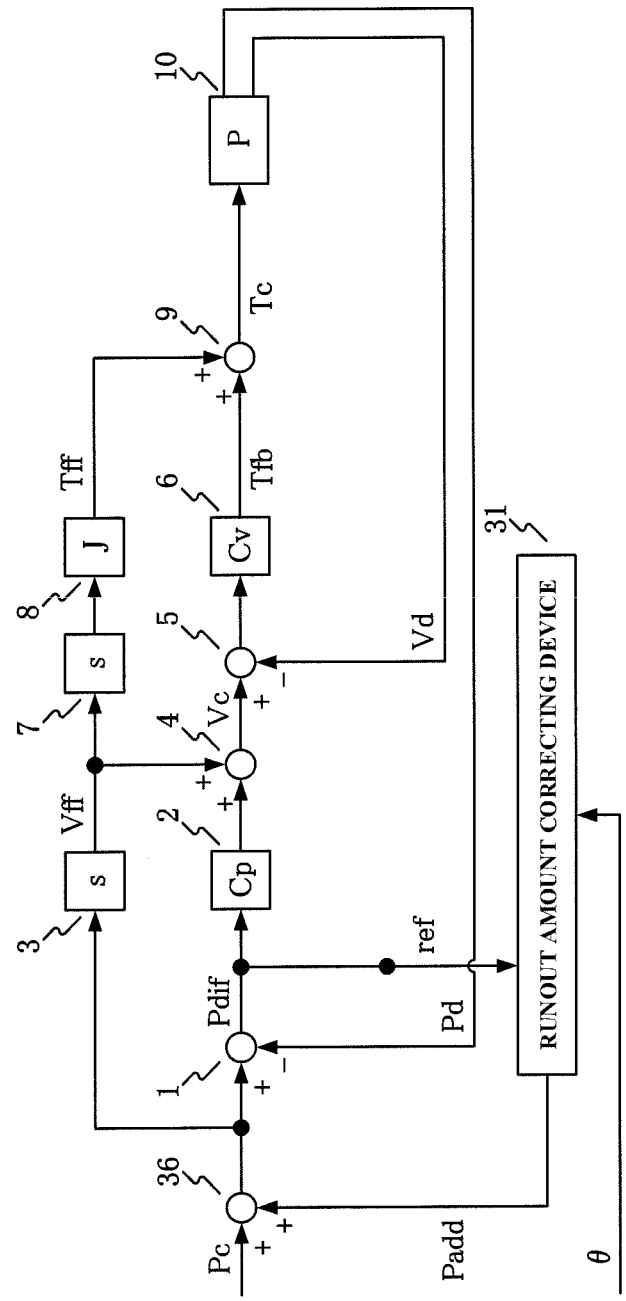
FIG. 1 is a block diagram of a position controller of Embodiment 1.
Figure 2:
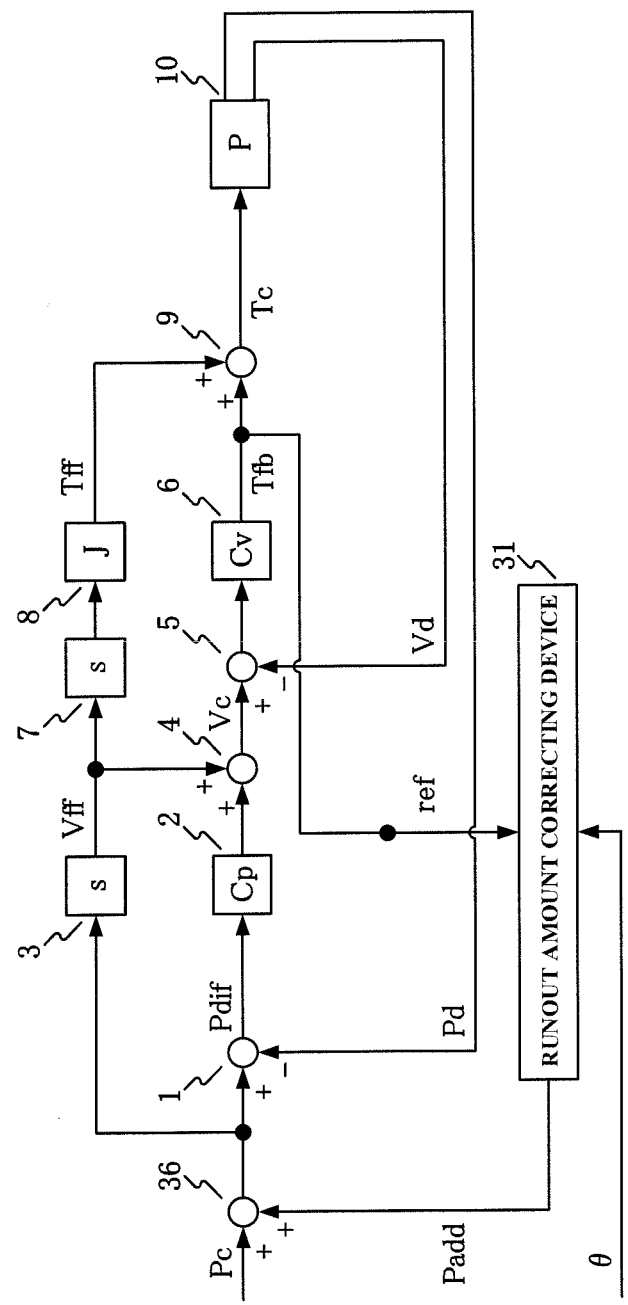
FIG. 2 is a block diagram of a position controller of Embodiment 2.
Figure 3:
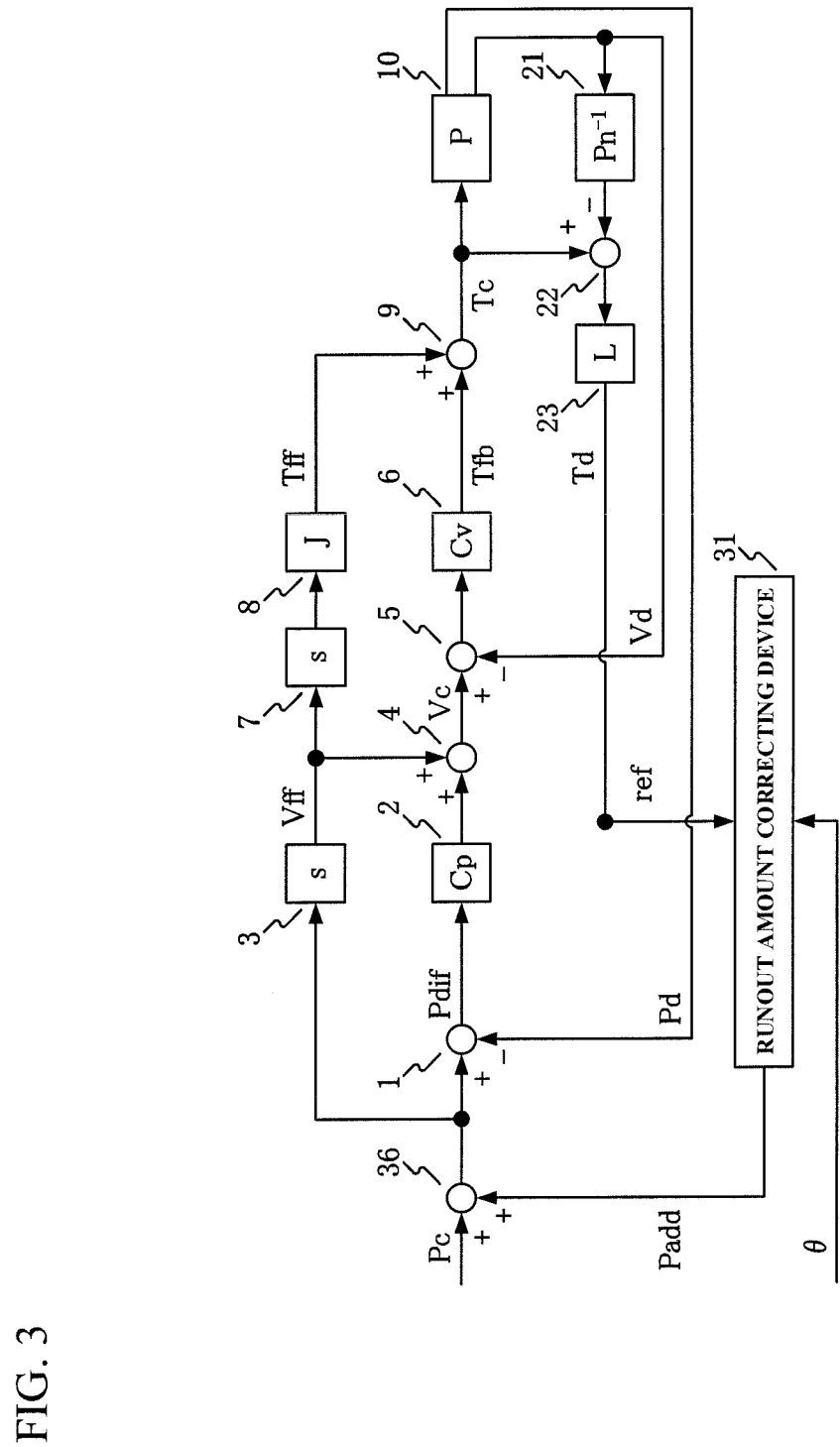
FIG. 3 is a block diagram of a position controller of Embodiment 3.

FIG. 1 to FIG. 3 are block diagrams illustrating position controllers of feed axes for a machine tool of respective Embodiments 1 to 3 of the present invention. Common to the respective embodiments, for example, the following well-known machine tool is considered. The machine tool includes a main spindle head on a front face of a column disposed upright on a bed. The main spindle head has a main spindle to which a tool is attached. The main spindle head is controlled movable in the X-axis direction and the Z-axis direction by an X-axis control unit and a Z-axis-control unit. A table is disposed on the bed so as to be controlled movable in the Y-axis direction by a Y-axis control unit such that a workpiece can be secured on the table. The tool used here includes a plurality of cutting edges circumferentially disposed on a concentric circle at equal intervals.

In FIG. 1 to FIG. 3, a substractor 1 calculates a position deviation Pdif from a difference between a position command value $P_c$ and a position detection value $P_d$ of a position detector. A numerical control unit, which is as a higher-level device to control respective control units, instructs the position command value $P_c$. The position detector is mounted to a servo motor in a target plant (here, a Y-axis control unit) 10, which is a feed axis mechanism, or a table. A speed command operator 2 amplifies the calculated position deviation Pdif. Then, an adder 4 (a first adder) adds the position command value $P_c$ to a speed feed forward Vff, which is obtained by differentiation by a differentiator 3, thus obtaining a speed command value $V_c$.

Next, a substractor 5 operates a difference between the speed command value $V_c$ and a speed detection value $V_d$. The speed detection value $V_d$ is obtained by differentiation of the position detection value $P_d$ or is directly obtained from a speed detector, which is mounted in a target plant 10. Then, a torque command operator 6 amplifies the difference, thus obtaining a feedback torque Tfb. Furthermore, an adder 9 (a second adder) adds the feedback torque Tfb to a torque feed forward Tff, thus obtaining a torque command value $T_c$. The torque feed forward Tff is calculated by differentiating the speed feed forward Vff by a differentiator 7 and multiplying the differentiated value by a motor shaft conversion inertia 8 of a movable part in the target plant 10. The target plant 10 causes the servo motor in the target plant 10 to generate a torque corresponding to the torque command value $T_c$ by a control by a current control unit (not illustrated) as a drive unit. For example, via a ball screw, the target plant 10 drives the table as a driven body in the target plant 10.

Here, in FIG. 1, the position deviation Pdif is configured as a reference signal ref. In FIG. 2, the feedback torque Tfb is configured as the reference signal ref. In FIG. 3, a substractor 22 operates a difference between a value obtained by multiplying the speed detection value $V_d$ by reverse characteristic $P_n^{-1}$ of a nominal value $P_n$ of the target plant 10 and the torque command value $T_c$. An estimated disturbance value $T_d$ obtained by passing the output from the substractor 22 through a low-pass filter 23 is configured as the reference signal ref.

Meanwhile, a runout amount correcting device 31 calculates a position correction amount Padd from the reference signal ref and rotation angle information θ of the main spindle obtained from the higher-level device. An adder 36 (a third adder) superimposes the calculated position correction amount Padd to the position command value $P_c$ to correct the position command value $P_c$.

Figure 4:
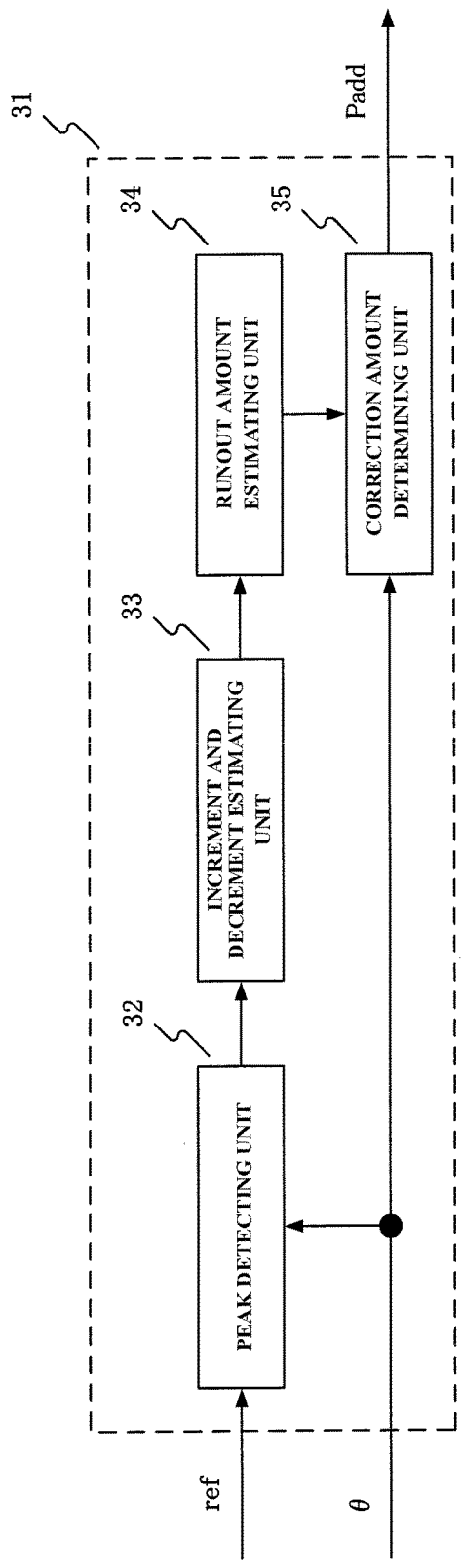
FIG. 4 is a block diagram of a runout amount correcting device.

As illustrated in FIG. 4, the runout amount correcting device 31 includes a peak detecting unit 32, an increment and decrement estimating unit 33, a runout amount estimating unit 34, and a correction amount determining unit 35.

The peak detecting unit 32 uses the rotation angle information θ of the main spindle to identify which cutting edge of the tool performs the machining. Simultaneously, the peak detecting unit 32 monitors the reference signal ref to detect a peak value in a waveform appearing due to an influence of cutting the workpiece with these cutting edges. The peak value in the waveform detected here is a value correlated to the actual machining allowance $fz_i$ (i=1 to Z). If the actual machining allowance $fz_i$ is large, the peak value is also detected as a large value. If the actual machining allowance $fz_i$ is small, the peak value is also detected as a small value. The peak value in the waveform, which appears due to the influence of cutting the workpiece with these cutting edges, is detected by the number of cutting edges Z of the tool in one-rotation of the main spindle at approximately attached intervals of the cutting edges.

Next, the increment and decrement estimating unit 33 estimates the increment/decrement $D_i$ (i=1 to Z) of the machining allowance of the respective cutting edges from the peak value of the reference signals ref, which is detected by the peak detecting unit 32, for the respective cutting edges.

Further, the runout amount estimating unit 34 calculates the runout amount $C_i$ of each cutting edge from the increment/decrement $D_i$ of the estimated machining allowance of each cutting edge.

Then, the correction amount determining unit 35 determines the position correction amount Padd such that the correction amount according to the runout amounts $C_i$ of the cutting edges, which are calculated by the runout amount estimating unit 34, can be applied when the workpiece is cut with these cutting edges at the next time.

These operations from the peak detecting unit 32 to the correction amount determining unit 35 are repeatedly performed until the peak values appearing in the reference signals ref are leveled. This allows enhancing the estimation accuracy of the runout amounts $C_i$ of the cutting edges.

The following describes with concrete examples. Similar to the related art, the following describes with an example of the number of cutting edges Z of the tool being 3 [cutting edges]. Further, the runout amounts $C_i$ (i=1 to Z) of the respective cutting edges are: $C_1=0$ [μm], $C_2=20$ [μm], and $C_3=25$ [μm].

As described above, when the workpiece is machined with the respective cutting edges in the order of #1, #2, #3, #1, #2, #3, and so on with the instructed machining allowance (the feed amount of one cutting edge) fz being 80 [μm], the actual machining allowances $fz_i$ (i=1 to Z) of the respective cutting edges become $fz_1=55$ [μm], $fz_2=100$ [μm], and $fz_3=85$ [μm].

Figure 5:
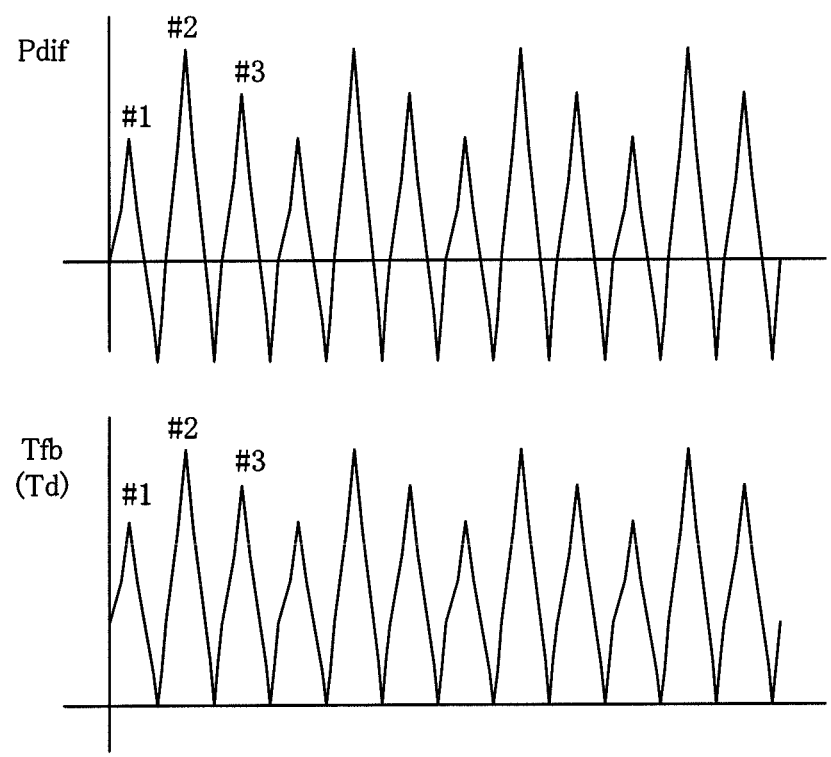
FIG. 5 is examples of waveforms of reference signals before correcting a runout of a cutting edge of a tool.

At this time, a cutting load proportional to the actual machining allowance $fz_i$ acts as a torque disturbance. Accordingly, the position deviation Pdif and the feedback torque Tfb (the estimated disturbance value $T_d$) vary as illustrated in FIG. 5. In the case where the configuration of the position controller is the aspect illustrated in FIG. 1, Pdif on the upper graph in FIG. 5 is observed as the reference signal ref. In the case where the configuration of the position controller is the aspect illustrated in FIG. 2 or FIG. 3, Tfb ($T_d$) on the lower graph in FIG. 5 is observed as the reference signal ref.

Then, the peak detecting unit 32 monitors the reference signal ref to detect a peak value $Pref_i$ in the waveform as a value correlated to the actual machining allowance $fz_i$. At this time, the rotation angle information θ of the main spindle correspondingly manages which cutting edge generates the detected peak value.

Next, the increment and decrement estimating unit 33 estimates the increment/decrement $D_i$ of the machining allowance of each cutting edge from the peak value $Pref_i$, which is detected by the peak detecting unit 32, using, for example, the following formula (1).

$$D_i=\{Pref_i-\Sigma(Pref_i)/Z\}\times K_D \quad (1)$$

Here, $\{Pref_i-\Sigma(Pref_i)/Z\}$ is an operation to eliminate the offset component of $Pref_i$ and also set the total sum of the increment or decrements $D_i$ of the machining allowances to 0. $K_D$ represents an estimated gain to estimate the increment/decrement $D_i$ of the machining allowance. Setting a large estimated gain $K_D$ allows shortening time taken until the peak values $Pref_i$ are leveled. However, setting an excessive large value possibly fails to converge in the process of repeatedly estimating the runout amount $C_i$ of the cutting edge. Therefore, setting an appropriate value is required.

Afterwards, the runout amount estimating unit 34 calculates the runout amount $C_i$ of each cutting edge from the increment/decrement $D_i$ of the machining allowance of each cutting edge, which is estimated by the increment and decrement estimating unit 33, by, for example, the following formula (2).

$$C_i=(D_i-D_{i+1})/3 \text{ (Note that } D_{z+1}=D_1\text{)} \quad (2)$$

Provisionally, assume that the increment/decrement $D_i$ of the machining allowance of each cutting edge, which is estimated by the increment and decrement estimating unit 33, is $D_1=-25$ [μm], $D_2=20$ [μm], and $D_3=5$ [μm], $C_1=(D_1-D_2)/3=-15$ [μm], $C_2=(D_2-D_3)/3=5$ [μm], and $C_3=(D_3-D_1)/3=10$ [μm] can be calculated. From the runout amount of each cutting edge calculated by the formula (2), the offset component is eliminated such that the total sum becomes 0. Accordingly, the runout amounts become values different from the original values basing the cutting edge #1 ($C_1=0$ [μm], $C_2=20$ [μm], and $C_3=25$ [μm]) by the offset amount.

Next, the correction amount determining unit 35 calculates the correction amount $R_i$ (i=1 to Z) to each cutting edge by, for example, the following formula (3) based on the runout amounts $C_i$ of the cutting edges calculated by the runout amount estimating unit 34.

$$R_i=-C_i+R_i\cdot z^{-1} \text{ (Note that } R_i\cdot z^{-1} \text{ represents the previous value of } R_i\text{.)} \quad (3)$$

Further, when the cutting edge of #i cuts the workpiece at the next time, the correction amount determining unit 35 outputs the position correction amount Padd so as to be $R_i$. Consequently, similar to the case of the related art where the correction amounts $R_i$ (i=1 to Z) to the respective cutting edges are set as: $R_1=15$ [μm], $R_2=-5$ [μm], and $R_3=-10$ [μm], the actual machining allowances can be uniform, thus ensuring restraining the chipping of tool.

Figure 6:
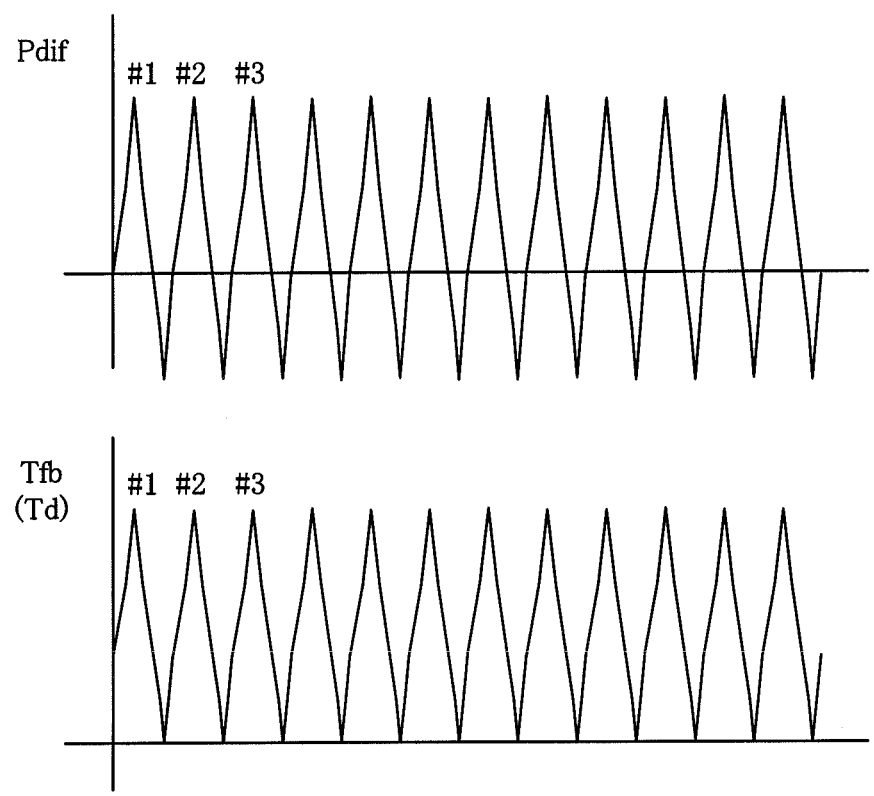
FIG. 6 is examples of waveforms of the reference signals after correcting the runout of the cutting edge of the tool.

As illustrated in FIG. 6, even after the appropriate correction amounts $R_i$ are calculated and the peak values appearing in the reference signal ref are leveled, the formula (3) keeps the appropriate correction amount $R_i$. This allows maintaining the state where the actual machining allowances are uniform.

The embodiment calculates the increment or decrement D of the machining allowance of each cutting edge by the formula (1), the runout amount $C_i$ of each cutting edge by the formula (2), and the correction amount $R_i$ to each cutting edge by the formula (3). However, the operation methods for the respective values are not limited to these formulas. Especially, the optimum operational formula for the formula (2) differs depending on the number of cutting edges Z of the tool. For example, in the case of Z=4 [cutting edges], $C_i$ is calculated by the following formula (4).

$$C_i=(D_i-2D_{i+1}-D_{i+2})/4 \text{ (Note that } D_{z+1}=D_1 \text{ and } D_{z+2}=D_2 \text{ are assumed.)} \quad (4)$$

The formula (2) and the formula (4) are formulas generalized for any given number of cutting edges Z in the following formula (5) under the conditions of $\Sigma C_i=0$ and $\Sigma D_i=0$. The formula (5) is a relational formula obtained by adding $0=C_1+C_2+\ldots+C_z$ (because $\Sigma C_i=0$) to the lowest formula of the following formula (6): $D_z=-C_{z-1}+C_z$, which is a matrix representation of $D_i=C_i-C_{i-1}$.

[Expression 1]

$$\begin{bmatrix} C_1 \\ C_2 \\ C_3 \\ \vdots \\ C_{Z-1} \\ C_Z \end{bmatrix} = \begin{bmatrix} 1 & 0 & 0 & \ldots & 0 & -1 \\ -1 & 1 & 0 & \ldots & 0 & 0 \\ 0 & -1 & 1 & \ldots & 0 & 0 \\ \vdots & \vdots & & \ddots & \vdots & \vdots \\ 0 & 0 & 0 & & 1 & 0 \\ 1 & 1 & 1 & \ldots & 0 & 2 \end{bmatrix}^{-1} \begin{bmatrix} D_1 \\ D_2 \\ D_3 \\ \vdots \\ D_{Z-1} \\ D_Z \end{bmatrix} \quad (5)$$

-continued $$\begin{bmatrix} D_1 \\ D_2 \\ D_3 \\ \vdots \\ D_{Z-1} \\ D_Z \end{bmatrix} = \begin{bmatrix} 1 & 0 & 0 & \cdots & 0 & -1 \\ -1 & 1 & 0 & \cdots & 0 & 0 \\ 0 & -1 & 1 & \cdots & 0 & 0 \\ \vdots & \vdots & & \ddots & \vdots & \vdots \\ 0 & 0 & 0 & & 1 & 0 \\ 0 & 0 & 0 & \cdots & -1 & 1 \end{bmatrix}^{-1} \cdot \begin{bmatrix} C_1 \\ C_2 \\ C_3 \\ \vdots \\ C_{Z-1} \\ C_Z \end{bmatrix} \quad (6)$$

Here, in the cases of Z=3 and Z=4, the respective formulas are expressed as follows. The formulas correspond to the respective formula (2) and formula (4).

[Expression 2]

$$Z = 3$$

$$\begin{bmatrix} C_1 \\ C_2 \\ C_3 \end{bmatrix} = \begin{bmatrix} 1 & 0 & -1 \\ -1 & 1 & 0 \\ 1 & 0 & 2 \end{bmatrix}^{-1} \cdot \begin{bmatrix} D_1 \\ D_2 \\ D_3 \end{bmatrix} = \frac{1}{3} \cdot \begin{bmatrix} 2 & 0 & 1 \\ 2 & 3 & 1 \\ -1 & 0 & 1 \end{bmatrix} \begin{bmatrix} D_1 \\ D_2 \\ D_3 \end{bmatrix}$$

$$= \frac{1}{3} \cdot \begin{bmatrix} 1 & -1 & 0 \\ 0 & 1 & -1 \\ -1 & 0 & 1 \end{bmatrix} \cdot \begin{bmatrix} D_1 \\ D_2 \\ D_3 \end{bmatrix} \quad (\because \Sigma D_i = 0)$$

$$Z = 4$$

$$\begin{bmatrix} C_1 \\ C_2 \\ C_3 \\ C_4 \end{bmatrix} = \begin{bmatrix} 1 & 0 & 0 & -1 \\ -1 & 1 & 0 & 0 \\ 0 & -1 & 1 & 0 \\ 1 & 1 & 0 & 2 \end{bmatrix}^{-1} \cdot \begin{bmatrix} D_1 \\ D_2 \\ D_3 \\ D_4 \end{bmatrix} = \frac{1}{4} \cdot \begin{bmatrix} 2 & -1 & 0 & 1 \\ 2 & 3 & 0 & 1 \\ 2 & 3 & 4 & 1 \\ -2 & -1 & 0 & 1 \end{bmatrix} \begin{bmatrix} D_1 \\ D_2 \\ D_3 \\ D_4 \end{bmatrix}$$

$$= \frac{1}{4} \cdot \begin{bmatrix} 1 & -2 & -1 & 0 \\ 0 & 1 & -2 & -1 \\ -1 & 0 & 1 & -2 \\ -2 & -1 & 0 & 1 \end{bmatrix} \cdot \begin{bmatrix} D_1 \\ D_2 \\ D_3 \\ D_4 \end{bmatrix}$$

$$(\because \Sigma D_i = 0)$$

In FIG. 3, to obtain the estimated disturbance value $T_d$, a disturbance observer is used. However, a configuration that adds the estimated disturbance value $T_d$ to the torque command value $T_c$ to cancel a disturbance component may be used. Additionally, as long as an influence of the cutting load can be detected, the configuration of the disturbance observer is not limited to the configuration in FIG. 3.

Further, the embodiment describes the example where the variation of the cutting load similarly occurs in each rotation of the main spindle in the reference signal ref as illustrated in FIG. 5. However, in the actual machining, a case where the magnitude of the cutting load gradually changes is also assumed. However, even in the case, in the process of detecting the peak value $Pref_i$ of the reference signal ref by the peak detecting unit 32, the previous value $Pref_i \cdot z^{-1}$ and the last value but one of the peak value $Pref_i \cdot z^{-2}$ of the peak value $Pref_i$ of the identical cutting edge are referred. This allows identifying to what extent the cutting load is in an upward tendency (a downward tendency). Accordingly, the components of the upward tendency (the downward tendency) of the cutting load included in the peak value $Pref_i$ can be separately considered. Consequently, even with the case where the cutting load changes in every rotation of the main spindle, the estimation and the correction of the runout amount of cutting edge are possible.

As described above, the position controller according to each embodiment includes the speed command operator 2, the adder 4, the torque command operator 6, the adder 9, the drive unit, the runout amount correcting device 31, and the adder 36. The speed command operator 2 is configured to amplify the position deviation Pdif between the position command value $P_c$ and the position detection value $P_d$. The adder 4 is configured to add the speed feed forward Vff and the output from the speed command operator 2 to output the speed command value $V_c$. The speed feed forward Vff is obtained by differentiation of the position command value $P_c$. The torque command operator 6 is configured to amplify a deviation between the speed command value $V_c$ and the speed detection value $V_d$ of the movable part to output the feedback torque Tfb. The adder 9 is configured to add the torque feed forward Tff and the feedback torque Tfb to output the torque command value $T_c$. The torque feed forward Tff is obtained by differentiating the speed feed forward Vff and multiplying the differentiated value by the motor shaft conversion inertia. The drive unit is configured to drive the servo motor upon the torque command value $T_c$. The runout amount correcting device 31 is configured to calculate the position correction amount Padd from the reference signal ref and the rotation angle information θ of the main spindle such that influences of the respective cutting edges are leveled. The adder 36 is configured to superimpose the position correction amount Padd to the position command value $P_c$ to correct the position command value $P_c$. Without the external device and the prior measurement, the runouts of the cutting edges of the tool can be corrected. This allows restraining the chipping of tool simply and at a low cost.

In the case of a machine tool that controls positions of a tool and a workpiece with a plurality of feed axes, changing a configuration of a runout amount correcting device is preferable. This allows easy detection of the variation of the cutting load or calculation of more appropriate correction amount. The following describes modifications of the runout amount correcting device. Like reference numerals designate corresponding or identical components throughout the above-described embodiments and the following modifications, and therefore such elements will not be further elaborated here.

Figure 7:
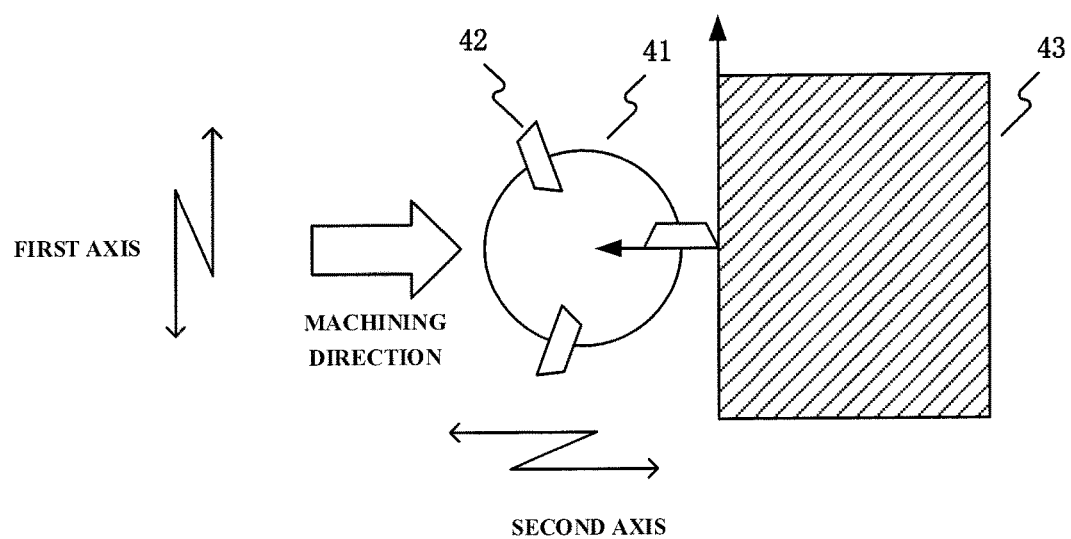
FIG. 7 is an explanatory view illustrating force acting on the tool during machining.

For example, example, as illustrated in FIG. 7, there is provided a configuration that controls a position of a main spindle head, which includes a tool 41, with a first axis (here, an X-axis control unit) and controls a position of a table, which secures a workpiece 43, with a second axis (here, a Y-axis control unit). When machining is performed in the movable direction of the second axis, as the cutting load applied to cutting edges 42 (here, three cutting edges), a principal force and thrust force acts. When the cutting edge 42 faces the machining direction, the principal force acts on the movable direction of the first axis while the thrust force acts on the movable direction of the second axis. The magnitude of the principal force is generally larger than the thrust force. That is, the influence of variation in the cutting load is likely to appear in the first axis, which is perpendicular to the machining direction, more than the second axis, which is the machining direction. The influence of the runout of the cutting edge appearing on the reference signal ref is also more remarkable.

Figure 8:
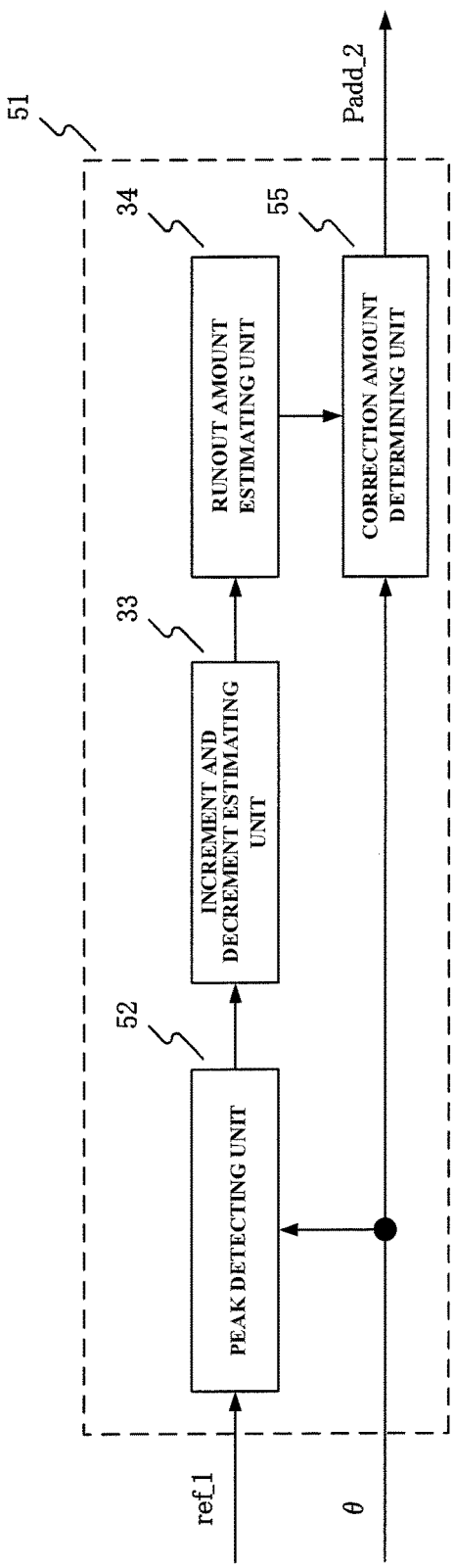
FIG. 8 is a block diagram of First Modification of a runout amount correcting device that supports a multi-axis control.

Therefore, when a runout amount correcting device 51 is configured like First Modification as illustrated in FIG. 8, the influence of the runout of the cutting edge can be more likely to be extracted.

This runout amount correcting device 51 includes a peak detecting unit 52, the increment and decrement estimating unit 33, the runout amount estimating unit 34, and a correction amount determining unit 55. The runout amount correcting device 51 differs from the runout amount correcting device 31 in FIG. 4 in the following points. To the peak detecting unit 32 of the runout amount correcting device 31, the reference signal ref is input. The correction amount determining unit 35 outputs the position correction amount Padd of the control axis identical to the reference signal ref. Meanwhile, here, to the peak detecting unit 52 here, a reference signal ref_1 of the first axis is input. The correction amount determining unit 55 outputs a position correction amount Padd_2 of the second axis, which is a different axis from the reference signal ref_1. Operation is performed in the same manner as the operation that performs correction while determining which cutting edge of the tool performs the machining in this axis direction from the rotation angle information θ of the main spindle.

The influence of the runout of the cutting edge appears not only in the machining direction but also in the direction perpendicular to the machining direction, which leads to unevenness of cutting allowance in each cutting edge in addition to the variation of the cutting load.

Figure 9:
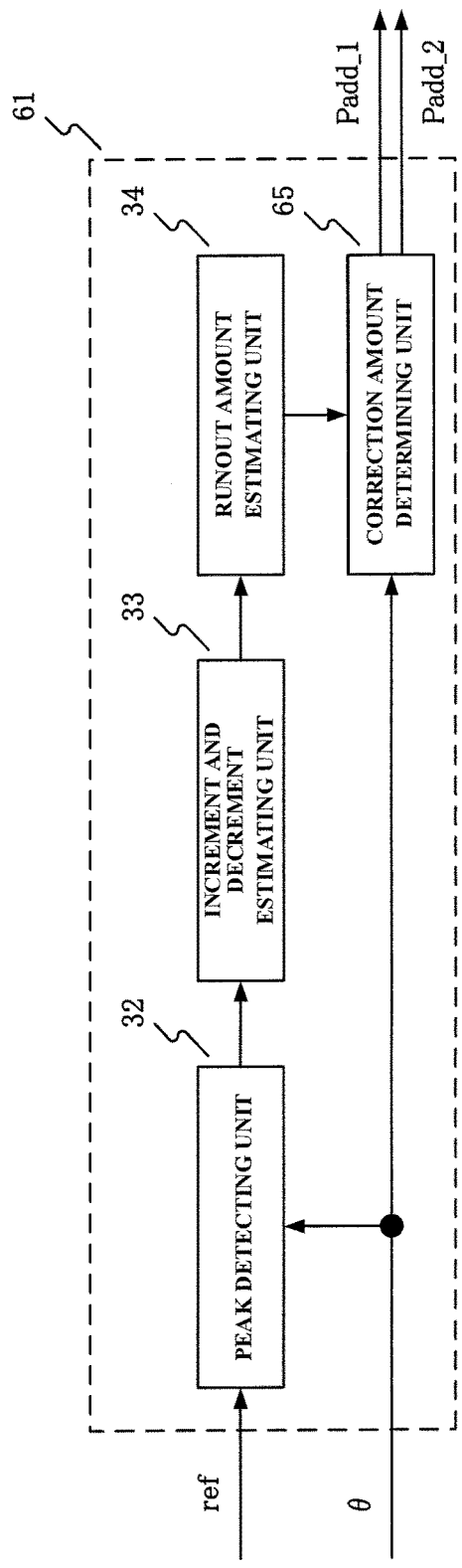
FIG. 9 is a block diagram of Second Modification of a runout amount correcting device that supports a multi-axis control.

Accordingly, when a runout amount correcting device 61 is configured like Second Modification illustrated in FIG. 9, the cutting loads in the respective machining direction and perpendicular direction can be leveled.

This runout amount correcting device 61 includes the peak detecting unit 32, the increment and decrement estimating unit 33, the runout amount estimating unit 34, and a correction amount determining unit 65.

The runout amount correcting device 61 differs from the runout amount correcting device 31 in FIG. 4 in the following points. The correction amount determining unit 35 of the runout amount correcting device 31 outputs the position correction amount Padd in one axis direction. Meanwhile, here, the correction amount determining unit 65 outputs both a position correction amount Padd_1 of a first axis and the position correction amount Padd_2 of a second axis. Operation is performed in the same manner as the operation that performs correction while determining which cutting edge of the tool performs the machining in this axis direction from the rotation angle information θ of the main spindle.

Here, the axes targeted for the correction are not necessary to be limited to two axes. It is also possible to add an axis as necessary according to the mechanical configuration. It is also possible to suitably allocate the position correction amount according to the machining direction and the axis configuration.

Next, focusing on the machining direction and the control axis direction, both do not always match as illustrated in FIG. 7. This possibly causes a divergence of the detection of variation of the cutting load and the correction.

Figure 10:
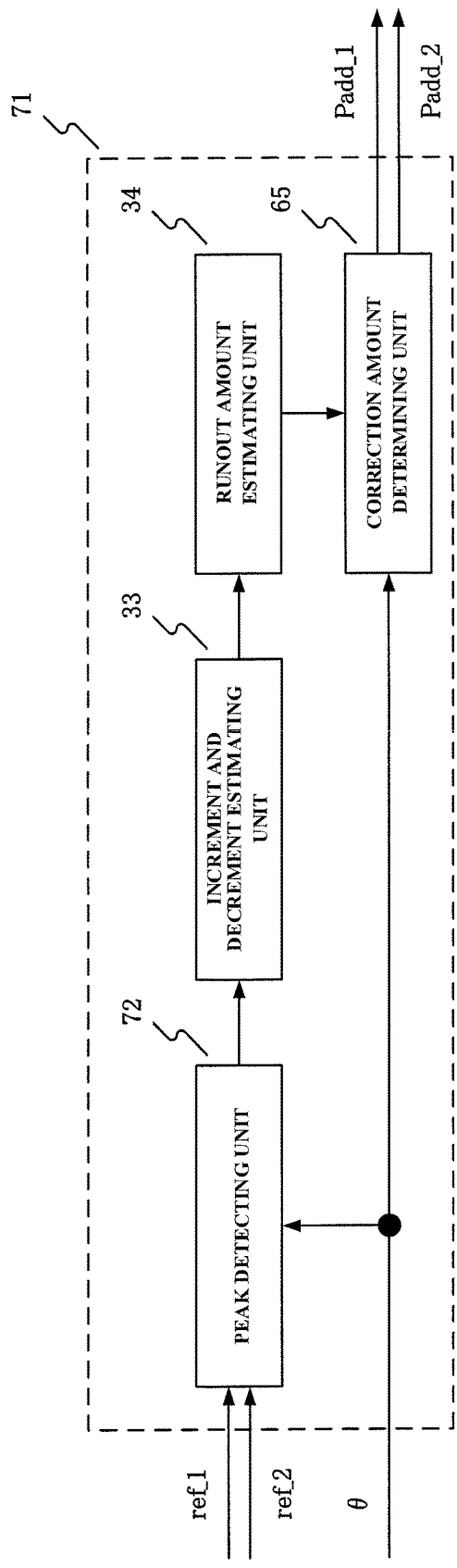
FIG. 10 is a block diagram of Third Modification of a runout amount correcting device that supports a multi-axis control.

Accordingly, when a runout amount correcting device 71 is configured like Third Modification as illustrated in FIG. 10, the cutting loads is appropriately leveled even if the machining direction differs from the control axis direction.

This runout amount correcting device 71 includes a peak detecting unit 72, the increment and decrement estimating unit 33, the runout amount estimating unit 34, and the correction amount determining unit 65. The runout amount correcting device 71 differs from the runout amount correcting device 61 in FIG. 9 in the following points. To the peak detecting unit 32 of the runout amount correcting device 61, the reference signal ref of one axis is input. Meanwhile, here, to the peak detecting unit 72, a plurality of reference signals, which are the reference signal ref_1 of the first axis and the reference signal ref_2 of the second axis, are input. Based on the configuration of the control axes, both signals are internally synthesized, and a synthesized signal corresponding to the machining direction component or the perpendicular direction component is calculated. Additionally, the peaks in the waveform of this synthesized signal, which appear by the influences of the respective cutting edges, are made correspond to the respective cutting edges and are detected.

Here, the reference signals to be input are not necessary to be limited to two axes. It is also possible to add an axis as necessary according to the mechanical configuration.

Thus, when the positions of the tool and the workpiece are controlled with the plurality of feed axes, changing the configuration of the runout amount correcting device makes it much easier to extract the influence of the runout of the cutting edge. Further, this allows levelling the cutting loads to the respective axis directions. Additionally, even if the machining direction and the control axis direction differ, the cutting loads can be appropriately leveled, so that restraining of the chipping of tool is ensured.

When the configuration of the runout amount correcting device 61 in FIG. 9 is employed, the reference signal ref is not always necessary to be the control signal calculated inside the position controller of the feed axis. It is also possible to configure the control signal calculated inside the main spindle control unit, which controls the main spindle to which the tool is attached, as the reference signal ref. The following describes the acquisition of the reference signal ref from this main spindle controller. The following describes the main spindle controller as the one that controls the rotation speed of the main spindle. However, the main spindle controller may have a configuration that controls the rotation angle (the position) of the main spindle. In this case as well, it is also possible to level the cutting loads similar to the position controllers of the feed axes.

Figure 11:
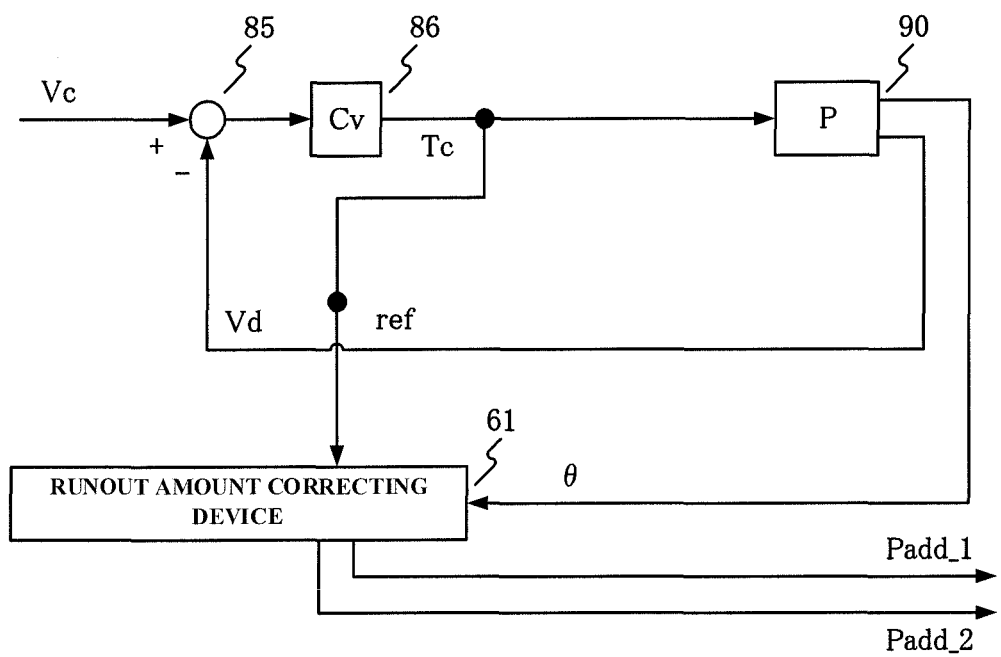
FIG. 11 is a block diagram of a first aspect that obtains a reference signal from a main spindle controller.
Figure 12:
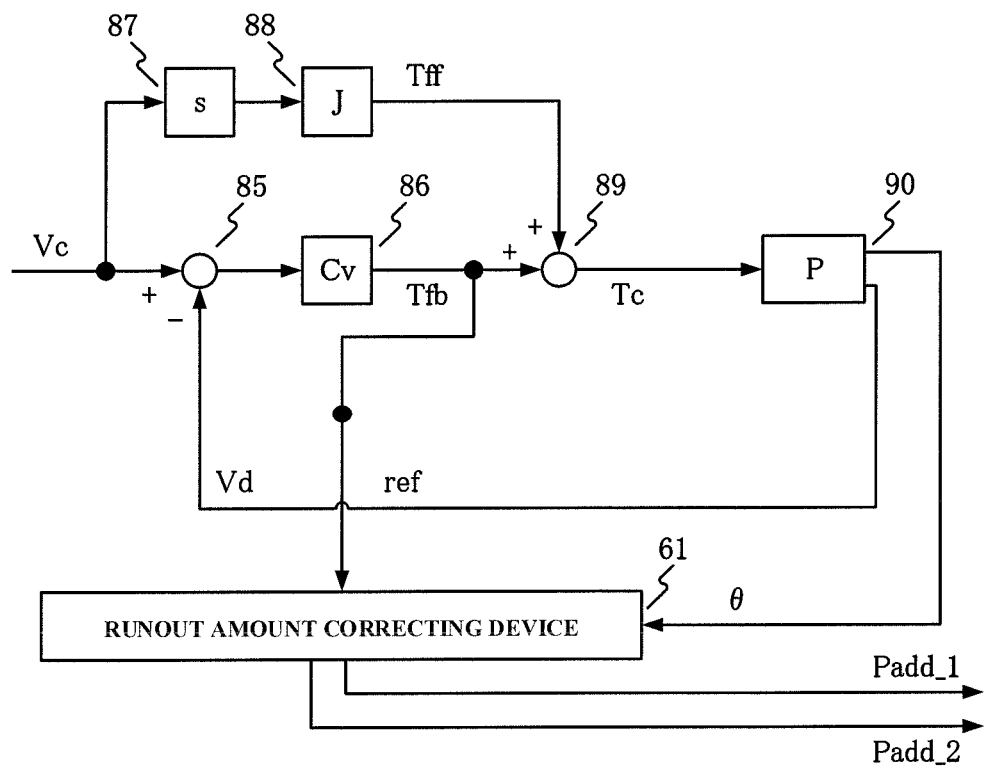
FIG. 12 is a block diagram of a second aspect that obtains a reference signal from a main spindle controller.
Figure 13:
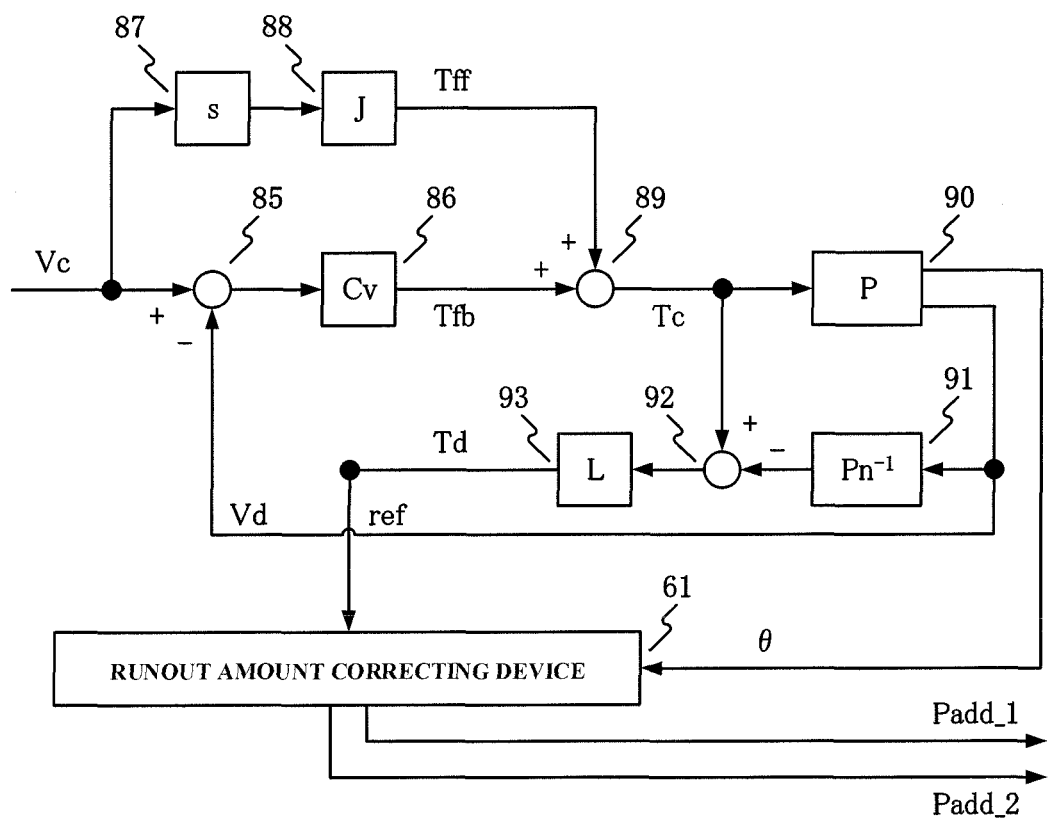
FIG. 13 is a block diagram of a third aspect that obtains a reference signal from a main spindle controller.

FIG. 11 to FIG. 13 are block diagrams illustrating the main spindle controllers of the first aspect to the third aspect. In each drawing, reference numeral 85 denotes a substractor. The substractor 85 operates a difference between a speed command value $V_c$ and the speed detection value $V_d$. A numerical control unit as the higher-level device to control the respective control units instructs the speed command value $V_c$. The speed detection value $V_d$ is obtained by differentiation of the position detection value from a main spindle position detector or is directly obtained from a main spindle speed detector. The main spindle speed detector or the main spindle position detector is mounted to the main spindle motor in a target plant 90.

In FIG. 11, this difference is amplified by a torque command operator 86, thus obtaining the torque command value $T_c$. In FIGS. 12 and 13, this difference is amplified by the torque command operator 86, thus obtaining a feedback torque Tfb.

An adder 89 adds this feedback torque Tfb to a torque feed forward Tff, thus obtaining a torque command value $T_c$. The spindle torque feed forward Tff is calculated by differentiating the speed command value $V_c$ by a differentiator 87 and multiplying the differentiated value by a motor shaft conversion inertia 88 of a main spindle movable part in the target plant 90. The target plant 90 causes the main spindle motor in the target plant 90 to generate a torque corresponding to the torque command value $T_c$ by a control by a current control unit (not illustrated) as a drive unit, thus rotating the tool attached to the main spindle.

Here, in the first aspect of FIG. 11, the torque command value $T_c$ is configured as the reference signal ref. In the second aspect of FIG. 12, the feedback torque Tfb is configured as the reference signal ref. In the third aspect of FIG. 13, a substractor 92 subtracts a difference between a value obtained by multiplying the speed detection value $V_d$ by reverse characteristic $P_n^{-1}$ of the nominal value $P_n$ of the target plant 90 and the torque command value $T_c$. An estimated disturbance value $T_d$ obtained by passing the output from the substractor 92 through a low-pass filter 93 is configured as the reference signal ref.

The main spindle controller in FIGS. 11 to 13 can configure the speed detection value $V_d$ as an integral or the position detection value directly obtained from the main spindle position detector as the rotation angle information θ of the main spindle. Inputting the rotation angle information θ and the reference signal ref of this main spindle to the runout amount correcting device 61 calculates the position correction amounts Padd_1 and Padd_2 of the respective axes of the feed axes.

In FIGS. 11 to 13, the torque command value $T_c$, the feedback torque Tfb, and the estimated disturbance value $T_d$ are each configured as the reference signals ref input to the runout amount correcting device 61. This uses a system that the principal force acting on the tool in FIG. 7 acts as a disturbance torque in the main spindle controller. A feedback control works so as to cancel this disturbance. That is, an increased runout of the cutting edge and an increased principal force also increase the disturbance torque, resulting in increase in the estimated disturbance value $T_d$. This also increases the torque command value $T_c$ and the feedback torque Tfb, which attempt to compensate the amount of the disturbance torque. On the contrary, a decreased runout of the cutting edge and a decreased principal force also decrease the disturbance torque, resulting in decrease in the estimated disturbance value $T_d$. This also decreases the torque command value $T_c$ and the feedback torque Tfb, which attempt to compensate the amount of the disturbance torque.

Thus, the influence of the runout of cutting edge is transferred to the torque command value $T_c$, the feedback torque Tfb, and the estimated disturbance value $T_d$, these values can be employed as the reference signals ref input to the runout amount correcting device 61. Correcting the calculated position correction amounts Padd_1 and Padd_2 of the respective axes of the feed axes by the respective axes of the feed axes allows appropriately leveling the cutting loads. This allows restraining the chipping of tool.

Figure 14:
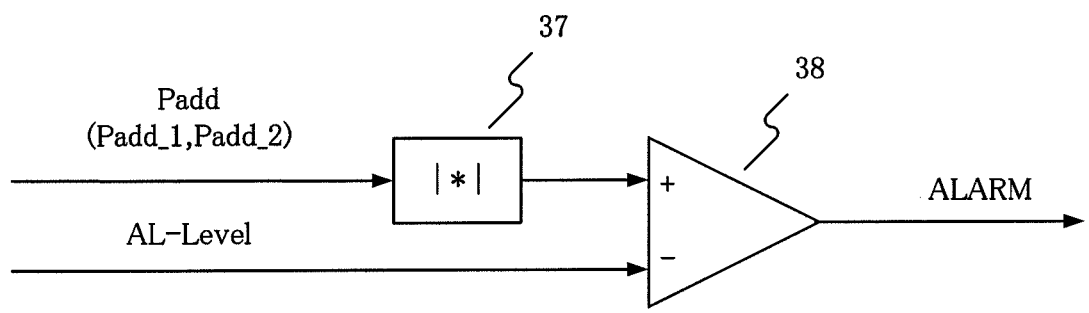
FIG. 14 is a configuration diagram to issue an alert if an estimated runout amount is large.
Figure 15:
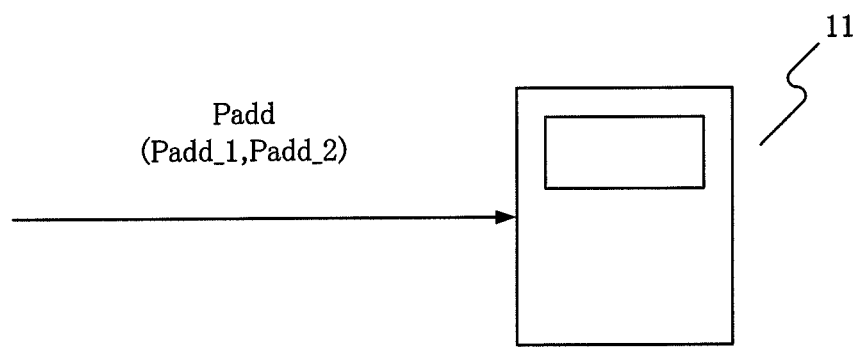
FIG. 15 is a configuration diagram to notify the estimated runout amount to an operator.

It is also possible to notify the operator of the large runout amount based on the estimated runout amounts of the cutting edges for calling his/her attention. FIG. 14 illustrates a configuration diagram to issue an alert if the estimated runout amount is large. FIG. 15 illustrates a configuration diagram to notify the operator of the estimated runout amount for confirmation and calling his/her attention. Upon this alert, the operator can review the runout of the cutting edge to ideally perform machining with little runouts of the cutting edges.

In FIG. 14, reference numeral 37 denotes an absolute value operator disposed inside the position controller. This absolute value operator 37 calculates the magnitude of the position correction amount Padd (or Padd_1 or Padd_2) from the position correction amount Padd (or Padd_1 or Padd_2) calculated by the correction amount determining unit 35 (or 55 or 65). A comparator 38 compares the magnitude and a preset alarm detection level AL-Level of the runout amount. As the result of comparison, if the magnitude of the position correction amount Padd (or Padd_1 or Padd_2) exceeds the alarm detection level AL-Level, an alarm ALARM as notification unit is output to call operator's attention. As the notification unit, except for this, various methods such as the following are considered. The state is indicated with a rotary indication light such as a revolving light (registered trademark), a warning message is displayed on an operating screen, or a buzz sound is generated. The plurality of methods can also be combined.

Meanwhile, in FIG. 15, a screen output unit 11, which is disposed on the machine tool, directly displays the position correction amount Padd (or Padd_1 or Padd_2) calculated by the correction amount determining unit 35 (or 55 or 65). The operator can confirm whether the runout amounts of the cutting edges are in an appropriate range or not. The screen output unit 11 may be disposed on the operating screen for input/output operation with the higher-level device. Alternatively, methods of separately installing a display screen as the screen output unit 11 or configuring a monitor screen of a personal computer coupled to the higher-level device and the position controller as the screen output unit 11 are also possible.

In FIGS. 14 and 15, the position correction amount Padd (or Padd_1 or Padd_2) to be input can be substituted by the correction amount $R_i$ (i=1 to Z) to each cutting edge calculated at the inside of the correction amount determining unit 35 (or 55 or 65).

Besides, the number of cutting edges of the tool is not limited to the aspects, and the number of cutting edges can be appropriately increased and decreased. Additionally, as long as the machine tool performs machining by rotating a tool, which is formed by mounting the plurality of cutting edges disposed on the concentric circle, for feed axis control, the model and the axis configuration, such as a multitasking machine and a machining center, are not limited. Not limited to the case where the first axis is perpendicular to the second axis, the present invention is applicable to the cases where the second axis is disposed inclined with respect to the first axis and both axes are disposed parallel for synchronous operation.

The invention may be configured as follows. The invention of a first aspect is configured as follows. A position controller of a feed axis for a machine tool that rotates a tool attached to a main spindle to machine a workpiece. The machine tool includes a feed axis mechanism with a servo motor to drive a load in a predetermined linear axis direction. The position controller includes a position detector, a speed command operator, a first adder, a torque command operator, a second adder, a drive unit, a runout amount correcting device, and a third adder. The position detector is configured to detect a position of a movable part of the feed axis mechanism so as to control the position of the movable part in accordance with a position command value of a feed axis from a higher-level device. The speed command operator is configured to amplify a deviation between the position command value and a position detection value from the position detector. The first adder is configured to add a speed feed forward and an output from the speed command operator to output a speed command value. The speed feed forward is obtained by differentiation of the position command value. The torque command operator is configured to amplify a deviation between the speed command value and a speed detection value to output a feedback torque. The speed detection value is obtained by detection of the speed of the movable part by a speed detector or by differentiation of the position detection value. The second adder is configured to add a torque feed forward and the feedback torque to output a torque command value. The torque feed forward is obtained by differentiating the speed feed forward and multiplying the differentiated value by a motor shaft conversion inertia of the movable part. The drive unit is configured to drive the servo motor upon the torque command value. The runout amount correcting device is configured to employ the deviation between the position command value and the position detection value from the position detector as a reference signal, and is configured to calculate a position correction amount from rotation angle information of the main spindle and the reference signal. The rotation angle information is obtained from the higher-level device. The third adder is configured to superimpose the position correction amount to the position command value to correct the position command value. The runout amount correcting device is configured to estimate a runout amount of a cutting edge of the tool from the reference signal, and is configured to calculate the position correction amount such that influences of the respective cutting edges appearing in the reference signal are leveled.

The invention of a second aspect is configured as follows. A position controller of a feed axis for a machine tool that rotates a tool attached to a main spindle to machine a workpiece. The machine tool includes a feed axis mechanism with a servo motor to drive a load in a predetermined linear axis direction. The position controller includes a position detector, a speed command operator, a first adder, a torque command operator, a second adder, a drive unit, a runout amount correcting device, and a third adder. The position detector is configured to detect a position of a movable part of the feed axis mechanism so as to control the position of the movable part in accordance with a position command value of a feed axis from a higher-level device. The speed command operator is configured to amplify a deviation between the position command value and a position detection value from the position detector. The first adder is configured to add a speed feed forward and an output from the speed command operator to output a speed command value. The speed feed forward is obtained by differentiation of the position command value. The torque command operator is configured to amplify a deviation between the speed command value and a speed detection value to output a feedback torque. The speed detection value is obtained by detection of the speed of the movable part by a speed detector or by differentiation of the position detection value. The second adder is configured to add a torque feed forward and the feedback torque to output a torque command value. The torque feed forward is obtained by differentiating the speed feed forward and multiplying the differentiated value by a motor shaft conversion inertia of the movable part. The drive unit is configured to drive the servo motor upon the torque command value. The runout amount correcting device is configured to employ the feedback torque as a reference signal, and is configured to calculate a position correction amount from rotation angle information of the main spindle and the reference signal. The rotation angle information is obtained from the higher-level device. The third adder is configured to superimpose the position correction amount to the position command value to correct the position command value. The runout amount correcting device is configured to estimate a runout amount of a cutting edge of the tool from the reference signal, and is configured to calculate the position correction amount such that influences of the respective cutting edges appearing in the reference signal are leveled.

The invention of a third aspect is configured as follows. A position controller of a feed axis for a machine tool that rotates a tool attached to a main spindle to machine a workpiece. The machine tool includes a feed axis mechanism with a servo motor to drive a load in a predetermined linear axis direction. The position controller includes a position detector, a speed command operator, a first adder, a torque command operator, a second adder, a drive unit, a disturbance observer, a runout amount correcting device, and a third adder. The position detector is configured to detect a position of a movable part of the feed axis mechanism so as to control the position of the movable part in accordance with a position command value of a feed axis from a higher-level device. The speed command operator is configured to amplify a deviation between the position command value and a position detection value from the position detector. The first adder is configured to add a speed feed forward and an output from the speed command operator to output a speed command value. The speed feed forward is obtained by differentiation of the position command value. The torque command operator is configured to amplify a deviation between the speed command value and a speed detection value to output a feedback torque. The speed detection value is obtained by detection of the speed of the movable part by a speed detector or by differentiation of the position detection value. The second adder is configured to add a torque feed forward and the feedback torque to output a torque command value. The torque feed forward is obtained by differentiating the speed feed forward and multiplying the differentiated value by a motor shaft conversion inertia of the movable part. The drive unit is configured to drive the servo motor upon the torque command value. The disturbance observer is configured to input a difference between a value obtained by multiplying the speed detection value by a reverse characteristic of a nominal value of the feed axis mechanism and the torque command value to a low-pass filter to obtain an estimated disturbance value. The feed axis mechanism is constituted of the servo motor and the load. The runout amount correcting device is configured to employ the estimated disturbance value as a reference signal. The runout amount correcting device is configured to calculate a position correction amount from rotation angle information of the main spindle and the reference signal. The rotation angle information is obtained from the higher-level device. The third adder is configured to superimpose the position correction amount to the position command value to correct the position command value. The runout amount correcting device is configured to estimate a runout amount of a cutting edge of the tool from the reference signal, and is configured to calculate the position correction amount such that influences of the respective cutting edges appearing in the reference signal are leveled.

The invention of a fourth aspect in any one of the first to third aspects is configured as follows. The runout amount correcting device includes a peak detecting unit, an increment and decrement estimating unit, a runout amount estimating unit, and a correction amount determining unit. The peak detecting unit is configured to detect a peak in a waveform and make the peak correspond to each of the cutting edges. The peak appears in the reference signal from an influence of each of the cutting edges. The increment and decrement estimating unit is configured to estimate an increment or decrement of a machining allowance of each of the cutting edges from a peak value in the reference signal to each of the cutting edges. The peak value is detected by the peak detecting unit. The runout amount estimating unit is configured to estimate a runout amount of each of the cutting edges from the increment or decrement of the machining allowance of each of the cutting edges. The increment or decrement is estimated by the increment and decrement estimating unit. The correction amount determining unit is configured to determine the position correction amount. The position correction amount is determined such that a correction amount based on the runout amount of each of the cutting edges is applied at timing of the respective cutting edges machining the workpiece. The runout amount is estimated by the runout amount estimating unit.

The invention of a fifth aspect in any one of the first to third aspects is configured as follows. The machine tool includes at least two of the feed axis mechanisms. The feed axis mechanisms are related to a first axis and a second axis. The second axis is installed separately from the first axis. The runout amount correcting device includes a peak detecting unit, an increment and decrement estimating unit, a runout amount estimating unit, and a correction amount determining unit. The peak detecting unit is configured to detect a peak in a waveform and make the peak correspond to each of the cutting edges. The peak appears in the reference signal related to the first axis from an influence of each of the cutting edges. The increment and decrement estimating unit is configured to estimate an increment or decrement of a machining allowance of each of the cutting edges from a peak value in the reference signal to each of the cutting edges. The peak value is detected by the peak detecting unit. The runout amount estimating unit is configured to estimate a runout amount of each of the cutting edges from the increment or decrement of the machining allowance of each of the cutting edges. The increment or decrement is estimated by the increment and decrement estimating unit. The correction amount determining unit is configured to determine the position correction amount related to the second axis. The position correction amount is determined such that a correction amount based on the runout amount of each of the cutting edges is applied at timing of the respective cutting edges machining the workpiece. The runout amount is estimated by the runout amount estimating unit.

The invention of a sixth aspect in any one of the first to third aspects is configured as follows. The machine tool includes the feed axis mechanisms related to a plurality of respective feed axes. The runout amount correcting device includes a peak detecting unit, an increment and decrement estimating unit, a runout amount estimating unit, and a correction amount determining unit. The peak detecting unit is configured to detect a peak in a waveform and make the peak correspond to each of the cutting edges. The peak appears in the reference signal from an influence of each of the cutting edges. The increment and decrement estimating unit is configured to estimate an increment or decrement of a machining allowance of each of the cutting edges from a peak value in the reference signal to each of the cutting edges. The peak value is detected by the peak detecting unit. The runout amount estimating unit is configured to estimate a runout amount of each of the cutting edges from the increment or decrement of the machining allowance of each of the cutting edges. The increment or decrement is estimated by the increment and decrement estimating unit. The correction amount determining unit is configured to determine the position correction amount for each of the feed axes. The position correction amount is determined such that a correction amount based on the runout amount of each of the cutting edges is applied at timing of the respective cutting edges machining the workpiece. The runout amount is estimated by the runout amount estimating unit.

The invention of a seventh aspect in any one of the first to third aspects is configured as follows. The machine tool includes at least two of the feed axis mechanisms. The feed axis mechanisms are related to a first axis and a second axis. The second axis is installed separately from the first axis. The runout amount correcting device includes a peak detecting unit, an increment and decrement estimating unit, a runout amount estimating unit, and a correction amount determining unit. The peak detecting unit is configured to detect a peak in a waveform and make the peak correspond to each of the cutting edges. The peak appears in a synthesized signal from an influence of each of the cutting edges. The synthesized signal is obtained by synthesizing the reference signal related to the first axis and the reference signal related to the second axis. The increment and decrement estimating unit is configured to estimate an increment or decrement of a machining allowance of each of the cutting edges from a peak value in the synthesized signal to each of the cutting edges. The peak value is detected by the peak detecting unit. The runout amount estimating unit is configured to estimate a runout amount of each of the cutting edges from the increment or decrement of the machining allowance of each of the cutting edges. The increment or decrement is estimated by the increment and decrement estimating unit. The correction amount determining unit is configured to determine the position correction amount of each of the axes. The position correction amount is determined such that a correction amount based on the runout amount of each of the cutting edges is applied at timing of the respective cutting edges machining the workpiece. The runout amount is estimated by the runout amount estimating unit.

The invention of an eighth aspect in the sixth aspect is configured as follows. The machine tool includes a main spindle controller. The main spindle controller is configured to control a rotation speed of the main spindle in accordance with a speed command value from a higher-level device. The main spindle controller includes a torque command operator and a drive unit. The torque command operator is configured to amplify a deviation between the speed command value and a speed detection value to output a torque command value. The speed detection value is obtained by detection by a main spindle speed detector mounted to the main spindle. Alternatively, the speed detection value is obtained by differentiating a position detection value detected by a main spindle position detector mounted to the main spindle. The drive unit is configured to drive a main spindle motor upon the torque command value. The runout amount correcting device is configured to employ the torque command value obtained from the main spindle controller as the reference signal.

The invention of a ninth aspect in the sixth aspect is configured as follows. The machine tool includes a main spindle controller. The main spindle controller is configured to control a rotation speed of the main spindle in accordance with a speed command value from a higher-level device. The main spindle controller includes a torque command operator, an adder, and a drive unit. The torque command operator is configured to amplify a deviation between the speed command value and a speed detection value to output a feedback torque. The speed detection value is obtained by detection by a main spindle speed detector mounted to the main spindle. Alternatively, the speed detection value is obtained by differentiating a position detection value detected by a main spindle position detector mounted to the main spindle. The adder is configured to add a torque feed forward and the feedback torque to output a torque command value. The torque feed forward is obtained by differentiating the speed command value and multiplying the differentiated value by a motor shaft conversion inertia of the movable part of the main spindle. The drive unit is configured to drive a main spindle motor upon the torque command value. The runout amount correcting device is configured to employ the feedback torque obtained from the main spindle controller as the reference signal.

The invention of a tenth aspect in the sixth aspect is configured as follows. The machine tool includes a main spindle controller. The main spindle controller is configured to control a rotation speed of the main spindle in accordance with a speed command value from a higher-level device. The main spindle controller includes a torque command operator, an adder, a drive unit, and a disturbance observer. The torque command operator is configured to amplify a deviation between the speed command value and a speed detection value to output a feedback torque. The speed detection value is obtained by detection by a main spindle speed detector mounted to the main spindle. Alternatively, the speed detection value is obtained by differentiating a position detection value detected by a main spindle position detector mounted to the main spindle. The adder is configured to add a torque feed forward and the feedback torque to output a torque command value. The torque feed forward is obtained by differentiating the speed command value and multiplying the differentiated value by a motor shaft conversion inertia of the movable part of the main spindle. The drive unit is configured to drive a main spindle motor upon the torque command value. The disturbance observer is configured to input a difference between a value obtained by multiplying the speed detection value by a reverse characteristic of a nominal value of the main spindle motor and the torque command value to a low-pass filter to obtain an estimated disturbance value. The runout amount correcting device is configured to employ the estimated disturbance value obtained from the main spindle controller as the reference signal.

The invention of an eleventh aspect in any one of the first to tenth aspect is configured as follows. The position controller includes a notification unit or a screen output unit. The notification unit is configured to notify an excess of a magnitude of the position correction amount over a preset alarm detection level of the runout amount of the cutting edge. The screen output unit is configured to display the position correction amount to call operator's attention.

According to the present invention, without the external device and the prior measurement, the runouts of the cutting edges of the tool can be corrected. This allows restraining the chipping of tool simply and at a low cost.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A position controller of a feed axis for a machine tool, the machine tool rotating a tool attached to a main spindle to machine a workpiece, the machine tool including a feed axis mechanism with a servo motor to drive a load in a predetermined linear axis direction, the position controller comprising:
    a position detector configured to detect a position of a movable part of the feed axis mechanism so as to control the position of the movable part in accordance with a position command value of a feed axis from a numerical control unit;
    a speed command operator configured to amplify a deviation between the position command value and a position detection value from the position detector;
    a first adder configured to add a speed feed forward and an output from the speed command operator to output a speed command value, the speed feed forward being obtained by differentiation of the position command value;
    a torque command operator configured to amplify a deviation between the speed command value and a speed detection value to output a feedback torque, the speed detection value being obtained by detection of the speed of the movable part by a speed detector or by differentiation of the position detection value;
    a second adder configured to add a torque feed forward and the feedback torque to output a torque command value, the torque feed forward being obtained by differentiating the speed feed forward and multiplying the differentiated value by a motor shaft conversion inertia of the movable part;
    a drive unit configured to drive the servo motor upon the torque command value;
    a runout amount correcting device configured to employ a value related to deviation between a command value and a detection value in physical quantity of the movable part as a reference signal, the runout amount correcting device being configured to calculate a position correction amount from rotation angle information of the main spindle and the reference signal, the rotation angle information being obtained from the numerical control unit; and
    a third adder configured to superimpose the position correction amount to the position command value to correct the position command value, wherein
    the runout amount correcting device is configured to estimate a runout amount of a cutting edge of the tool from the reference signal, the runout amount correcting device being configured to calculate the position correction amount such that influences of the respective cutting edges appearing in the reference signal are leveled.

2. The position controller of the feed axis in the machine tool according to claim 1, wherein
    the physical quantity of the movable part is position, and
    the value related to deviation is the deviation between the position command value and the position detection value from the position detector.

3. The position controller of the feed axis in the machine tool according to claim 1, wherein
    the physical quantity of the movable part is torque, and
    the value related to deviation is the feedback torque.

4. The position controller of the feed axis in the machine tool according to claim 1, further comprising:
    a disturbance observer configured to input a difference between a value obtained by multiplying the speed detection value by a reverse characteristic of a nominal value of the feed axis mechanism and the torque command value to a low-pass filter to obtain an estimated disturbance value, the feed axis mechanism being constituted of the servo motor and the load, wherein
    the physical quantity of the movable part is torque, and
    the value related to deviation is the estimated disturbance value.

5. The position controller of the feed axis in the machine tool according to claim 1, wherein
the runout amount correcting device includes:
a peak detecting unit configured to detect a peak in a waveform and make the peak correspond to each of the cutting edges, the peak appearing in the reference signal from an influence of each of the cutting edges;
an increment and decrement estimating unit configured to estimate an increment or decrement of a machining allowance of each of the cutting edges from a peak value in the reference signal to each of the cutting edges, the peak value being detected by the peak detecting unit;
a runout amount estimating unit configured to estimate a runout amount of each of the cutting edges from the increment or decrement of the machining allowance of each of the cutting edges, the increment or decrement being estimated by the increment and decrement estimating unit; and
a correction amount determining unit configured to determine the position correction amount, the position correction amount being determined such that a correction amount based on the runout amount of each of the cutting edges is applied at a timing of the respective cutting edges machining the workpiece, the runout amount being estimated by the runout amount estimating unit.

6. The position controller of the feed axis in the machine tool according to claim 1, wherein:
the machine tool includes at least two of the feed axis mechanisms, the feed axis mechanisms being related to a first axis and a second axis, the second axis being installed separately from the first axis, and
the runout amount correcting device includes:
a peak detecting unit configured to detect a peak in a waveform and make the peak correspond to each of the cutting edges, the peak appearing in the reference signal related to the first axis from an influence of each of the cutting edges;
an increment and decrement estimating unit configured to estimate an increment or decrement of a machining allowance of each of the cutting edges from a peak value in the reference signal to each of the cutting edges, the peak value being detected by the peak detecting unit;
a runout amount estimating unit configured to estimate a runout amount of each of the cutting edges from the increment or decrement of the machining allowance of each of the cutting edges, the increment or decrement being estimated by the increment and decrement estimating unit; and
a correction amount determining unit configured to determine the position correction amount related to the second axis, the position correction amount being determined such that a correction amount based on the runout amount of each of the cutting edges is applied at a timing of the respective cutting edges machining the workpiece, the runout amount being estimated by the runout amount estimating unit.

7. The position controller of the feed axis in the machine tool according to claim 1, wherein:
the machine tool includes the feed axis mechanisms related to a plurality of respective feed axes, and
the runout amount correcting device includes:
a peak detecting unit configured to detect a peak in a waveform and make the peak correspond to each of the cutting edges, the peak appearing in the reference signal from an influence of each of the cutting edges;
an increment and decrement estimating unit configured to estimate an increment or decrement of a machining allowance of each of the cutting edges from a peak value in the reference signal to each of the cutting edges, the peak value being detected by the peak detecting unit;
a runout amount estimating unit configured to estimate a runout amount of each of the cutting edges from the increment or decrement of the machining allowance of each of the cutting edges, the increment or decrement being estimated by the increment and decrement estimating unit; and
a correction amount determining unit configured to determine the position correction amount for each of the feed axes, the position correction amount being determined such that a correction amount based on the runout amount of each of the cutting edges is applied at a timing of the respective cutting edges machining the workpiece, the runout amount being estimated by the runout amount estimating unit.

8. The position controller of the feed axis in the machine tool according to claim 1, wherein:
the machine tool includes at least two of the feed axis mechanisms, the feed axis mechanisms being related to a first axis and a second axis, the second axis being installed separately from the first axis, and
the runout amount correcting device includes:
a peak detecting unit configured to detect a peak in a waveform and make the peak correspond to each of the cutting edges, the peak appearing in a synthesized signal from an influence of each of the cutting edges, the synthesized signal being obtained by synthesizing the reference signal related to the first axis and the reference signal related to the second axis;
an increment and decrement estimating unit configured to estimate an increment or decrement of a machining allowance of each of the cutting edges from a peak value in the synthesized signal to each of the cutting edges, the peak value being detected by the peak detecting unit;
a runout amount estimating unit configured to estimate a runout amount of each of the cutting edges from the increment or decrement of the machining allowance of each of the cutting edges, the increment or decrement being estimated by the increment and decrement estimating unit; and
a correction amount determining unit configured to determine the position correction amount of each of the axes, the position correction amount being determined such that a correction amount based on the runout amount of each of the cutting edges is applied at a timing of the respective cutting edges machining the workpiece, the runout amount being estimated by the runout amount estimating unit.

9. The position controller of the feed axis in the machine tool according to claim 7, wherein:
the machine tool includes a main spindle controller, the main spindle controller being configured to control a rotation speed of the main spindle in accordance with a second speed command value from a second numerical control unit,
the main spindle controller includes:
a second torque command operator configured to amplify a deviation between the second speed command value and a speed detection value to output a second torque command value, the speed detection value being obtained by detection by a main spindle speed detector mounted to the main spindle, alternatively, the speed detection value being obtained by differentiating a second position detection value detected by a main spindle position detector mounted to the main spindle; and a second drive unit configured to drive a main spindle motor upon the second torque command value, and the runout amount correcting device is configured to employ the second torque command value obtained from the main spindle controller as the reference signal.

10. The position controller of the feed axis in the machine tool according to claim 7, wherein:

the machine tool includes a main spindle controller, the main spindle controller being configured to control a rotation speed of the main spindle in accordance with a second speed command value from a second numerical control unit, the main spindle controller includes:

a second torque command operator configured to amplify a deviation between the second speed command value and a speed detection value to output a second feedback torque, the speed detection value being obtained by detection by a main spindle speed detector mounted to the main spindle, alternatively, the speed detection value being obtained by differentiating a second position detection value detected by a main spindle position detector mounted to the main spindle;

an adder configured to add a second torque feed forward and the second feedback torque to output a second torque command value, the second torque feed forward being obtained by differentiating the second speed command value and multiplying the differentiated value by a motor shaft conversion inertia of the movable part of the main spindle; and a second drive unit configured to drive a main spindle motor upon the second torque command value, and the runout amount correcting device is configured to employ the feedback torque obtained from the main spindle controller as the reference signal.

11. The position controller of the feed axis in the machine tool according to claim 7, wherein:

the machine tool includes a main spindle controller, the main spindle controller being configured to control a rotation speed of the main spindle in accordance with a second speed command value from a second numerical control unit, the main spindle controller includes:

a second torque command operator configured to amplify a deviation between the second speed command value and a speed detection value to output a second feedback torque, the speed detection value being obtained by detection by a main spindle speed detector mounted to the main spindle, alternatively, the speed detection value being obtained by differentiating a second position detection value detected by a main spindle position detector mounted to the main spindle;

an adder configured to add a second torque feed forward and the second feedback torque to output a second torque command value, the second torque feed forward being obtained by differentiating the second speed command value and multiplying the differentiated value by a motor shaft conversion inertia of the movable part of the main spindle;

a second drive unit configured to drive a main spindle motor upon the second torque command value; and a disturbance observer configured to input a difference between a value obtained by multiplying the speed detection value by a reverse characteristic of a nominal value of the main spindle motor and the second torque command value to a low-pass filter to obtain an estimated disturbance value, and the runout amount correcting device is configured to employ the estimated disturbance value obtained from the main spindle controller as the reference signal.

12. The position controller of the feed axis in the machine tool according to claim 1, wherein the position controller includes a notification unit or a screen output unit, the notification unit is configured to notify an excess of a magnitude of the position correction amount over a preset alarm detection level of the runout amount of the cutting edge, and the screen output unit is configured to display the position correction amount to call operator's attention.

\* \* \* \* \*